Jan. 11, 1966 A. ACHAMMER 3,228,542
APPARATUS FOR THE CONVEYANCE OF STANDARD SIZE OBJECTS
Filed March 4, 1963 5 Sheets-Sheet 1
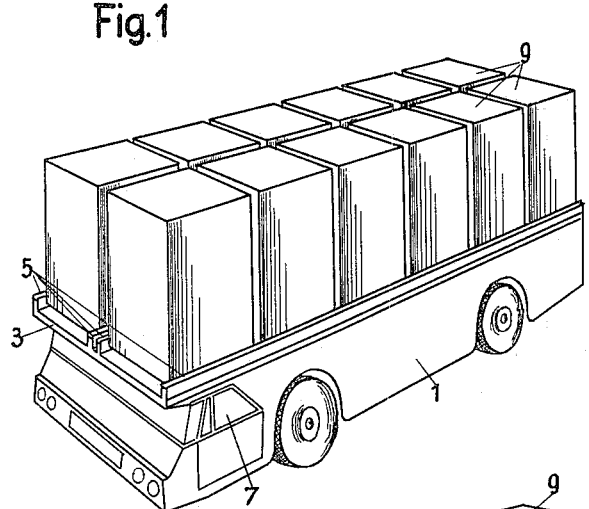
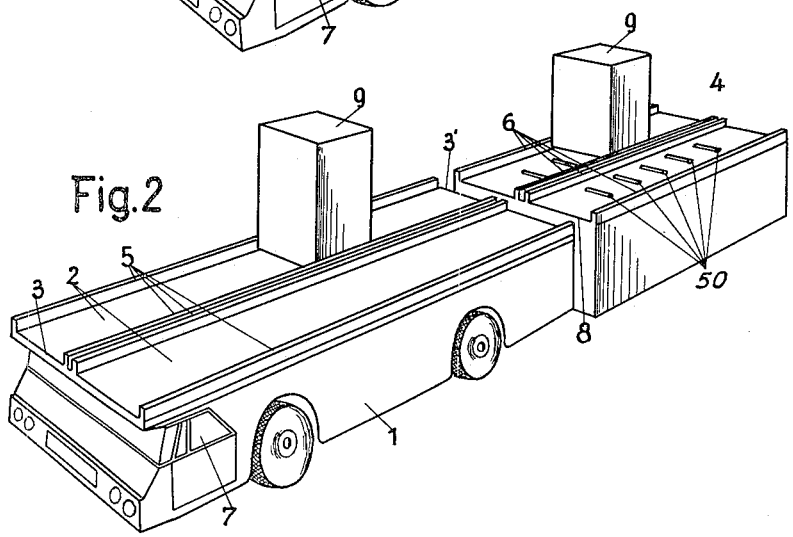

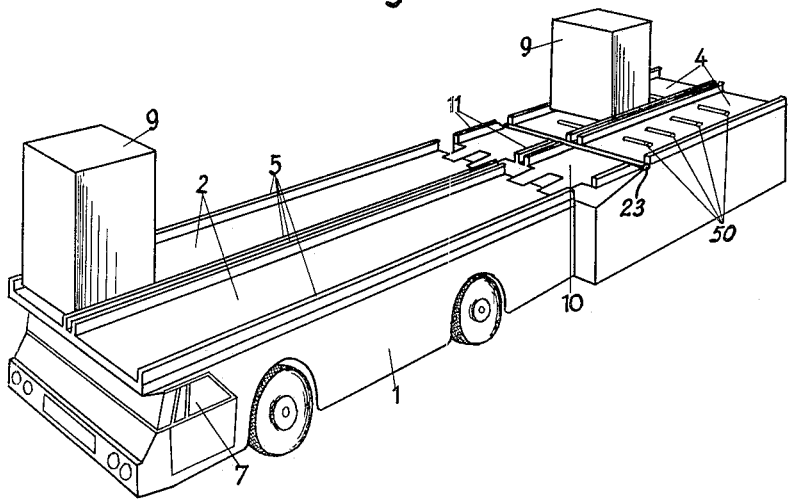
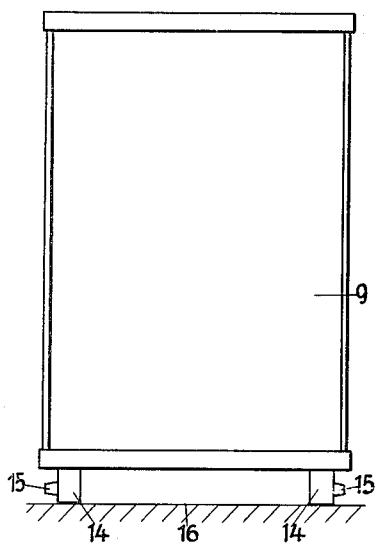
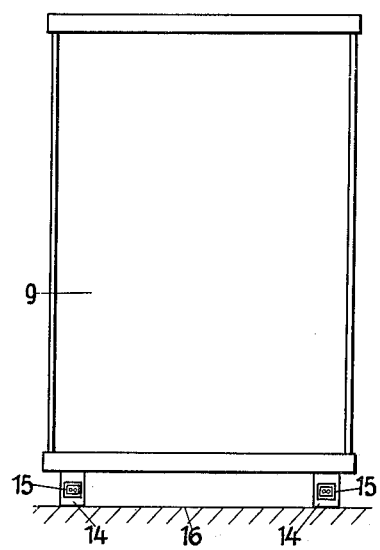

Jan. 11, 1966  A. ACHAMMER  3,228,542
APPARATUS FOR THE CONVEYANCE OF STANDARD SIZE OBJECTS
Filed March 4, 1963  5 Sheets-Sheet 3
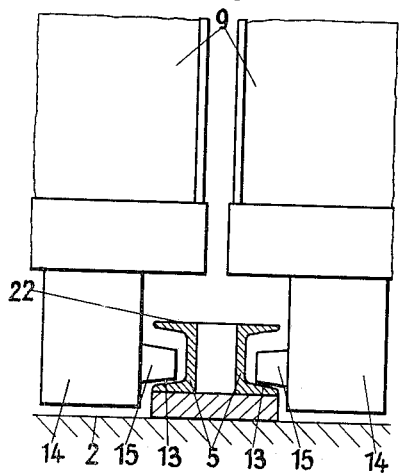
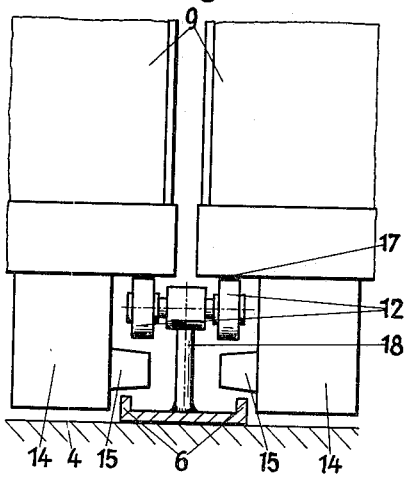
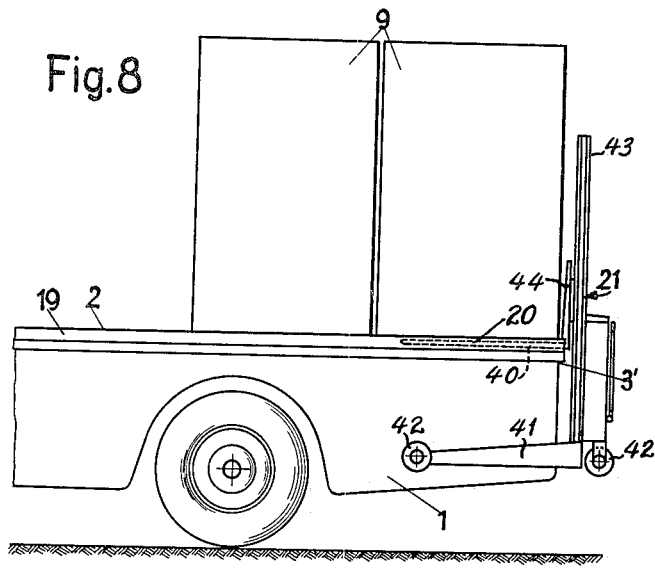

Jan. 11, 1966     A. ACHAMMER     3,228,542
APPARATUS FOR THE CONVEYANCE OF STANDARD SIZE OBJECTS
Filed March 4, 1963     5 Sheets-Sheet 4
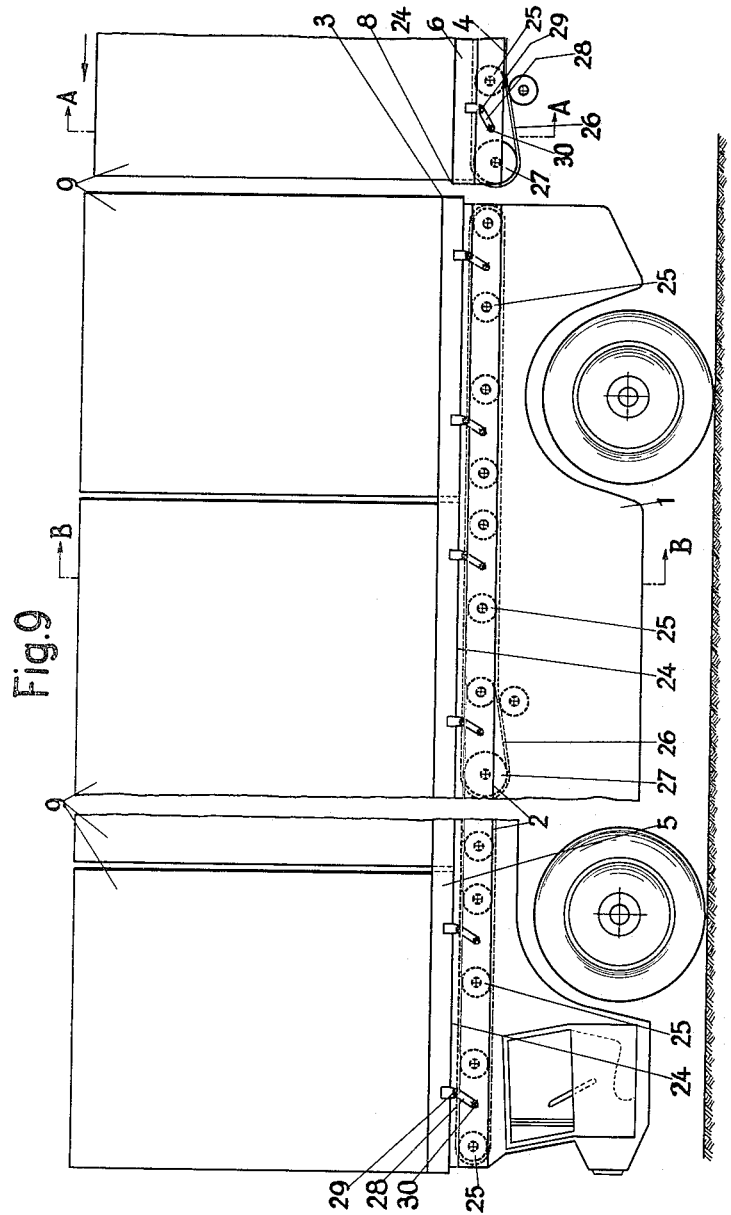

Jan. 11, 1966  A. ACHAMMER  3,228,542
APPARATUS FOR THE CONVEYANCE OF STANDARD SIZE OBJECTS
Filed March 4, 1963  5 Sheets-Sheet 5

United States Patent Office 3,228,542
Patented Jan. 11, 1966

3,228,542
APPARATUS FOR THE CONVEYANCE OF
STANDARD SIZE OBJECTS
Alfred Achammer, 106 Schneeburggasse,
Innsbruck, Austria
Filed Mar. 4, 1963, Ser. No. 262,574
Claims priority, application Austria, Mar. 10, 1962,
A 2,012/62; Jan. 17, 1963, A 358/63
4 Claims. (Cl. 214—38)

The invention relates to a device for the conveyance of load carriers by means of a transport vehicle the loading area of which can be linked up directly or indirectly with a material-handling platform.

In this application, the term load carrier is inclusive of containers having definite standardized dimensions. These can be in the form of parallelepipeds or cylinders or of some other form chosen at random; they may also be pallets. Hereinafter, the load carriers will be described in terms of containers of parallelepiped shape for purposes of convenience, although other forms of load carriers are equally applicable. The efficient use of modern storage is based on the development of such standardized containers.

For the conveyance of containers from one storage place to the other by means of a transport vehicle the loading area of which can be linked up directly or indirectly with a material-handling platform, the containers have been equipped with support rollers as a prerequisite for the gliding of the containers on the loading area and the material-handling platform. This is not only expensive, but complicates also the storage procedure as to time and space even in the case that a detachable connection is provided between the standardized containers and the support rollers. Moreover, the known devices of this type have usually no guide members for the standardized containers, which would guide these containers during their gliding toward well-defined loading or storage points and protect them there also during the travel of the transport vehicle from unwanted dislocations. In some rare cases rail guides were suggested, however, of complicated special constructions which were unsuitable in practice.

The aim of this invention is to avoid the disadvantages described and to adapt the conveyance of standardized containers to the rational capacity which has now been achieved for the storage in storehouses, etc.

According to the invention, this is obtained by providing guideways which can be fitted into each other on the loading area as well as on the material-handling platform for standardized containers without rollers.

The formation of the standardized containers without rollers, in principle and even during the gliding procedure, makes it possible to apply the invention to all sorts of standardized containers in their original standard form, without any additional expenses. Thus, containers, cases, pallets, etc. can be subjected to any loading or unloading procedure without any modification of their original form.

The rotational shaping of the loading area of the transport vehicle to match the material-handling platform by providing suitable guideways fitting into each other on the loading area of the transport vehicle and on the material-handling platform of the storage place offers considerable advantages resulting not only in a very marked acceleration of the loading and unloading procedures of the transport vehicle without obstructions, but guaranteeing also maximum utilization of the entire extent of the loading area of the transport vehicle.

It is of particular advantage, if the guideways provided directly on the loading area and the material-handling platform for the sides of the roller-less standardized containers are similar.

In practice it is particularly expedient to design the transport vehicle used within the scope of the invention in such a way that the rectangular loading area provided with the guideways extends above the driver's cab continuously along the entire length of the transport vehicle. In this case, the transport vehicle can be brought up to the material-handling platform either with its trailing edge or with its front edge and forms thus an extension of the latter. This permits an extremely rational loading of the transport vehicle. If at the destination of the transport similar material-handling platforms belonging to another storage place are provided, the conveyance of the goods from the transport vehicle to the material-handling platform of the target storage place can be performed very efficiently.

If the transport vehicle and the material-handling platform are joined by a connecting platform, according to a further characteristic feature of the invention the connecting platform will have extension guideways connecting the guideways of the material-handling platform with those of the loading area.

Advantageously, at least two slideway guides can be provided on the loading area of the transport vehicle, in parallel with its longitudinal axis.

The features mentioned will become apparent from a consideration of the embodiments of the invention as represented in the drawings and described below; the invention is, however, not restricted to the particular embodiments shown.

In the drawings:

FIG. 1 is a first embodiment of a vehicle showing the same in prespective in loaded condition;

FIG. 2 is a perspective view of the vehicle shown in FIG. 1 during loading thereof;

FIG. 3 is a perspective view of the vehicle in FIG. 2 during a later stage of loading;

FIG. 4 is the front view of a standardized transport container;

FIG. 5 is the corresponding lateral view of the container of FIG. 4;

FIG. 6 shows in detail the cross section of a particularly suitable construction of the guideways on the loading area of the transport vehicle;

FIG. 7 shows also in detail a cross section through a guideway construction of the material-handling platform;

FIG. 8 is a partial lateral view of the rear end of a transport vehicle with an attachment;

FIGURES 9, 10 and 11 represent an alternative embodiment in which elements of the guideways can be lifted and lowered, FIG. 9 showing a longitudinal view, FIG. 10 a cross section through line A—A of FIG. 9, and FIG. 11 a cross section through line B—B of FIG. 9.

Figure 10:
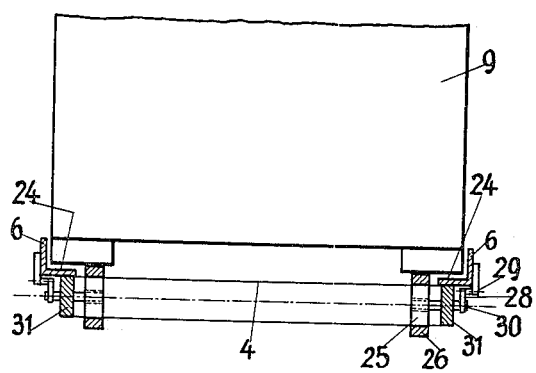

The loading area 2 of the transport vehicle 1 represented in FIGS. 1 to 3 has in this embodiment the shape of a rectangular platform. The distance between the edges 3, 3' of this platform correspond to the maximum length of the vehicle. The guideways 5, 6 are adapted for interengagement and are respectively fixed on the loading area of the transport vehicle 1 and on the material-handling platform 4. The latter platform may be the ramp of a storehouse. The guideways 5 of the transport vehicle 1 and the guideways 6 of the material-handling platform 4 are similar.

The material-handling platform 4 is provided with guideways 6 running at right angles to its end edge 8. In the embodiment shown in FIG. 1, they consist of rails mounted with a distance corresponding to the transverse dimension of a shipping container 9 so that the latter can be displaced between the two guideways 6 from the storage zone of the storehouse as far as to the edge 8 of the material-handling platform. The displacement can be performed by hand or by mechanical devices. In order to facilitate the shifting of the container, the guideways 6 of the material-handling platform 4 can be provided with rollers or pull-off rolls 50 on which the containers can be moved.

Anologously to the layout of the guideways 6 on the permanent material-handling platform 4, the loading area 2 of the transport vehicle is equipped with guideways 5, also in the form of rails. Their lateral spacing equals that of the rails 6 on the material-handling platform 4. If the platform of the loading area 2 of the transport vehicle 1 covers the driver's cab 7, as shown in FIGS. 1 to 3, and is arranged at a distance above the track which equals approximately the height of the corresponding material-handling platform 4, the transport vehicle 1 can be brought up to the material-handling platform 4 either with its front edge 3 or with its rear edge 3'. By suitable adjustment of the vehicle, the guideways 6 of the material-handling platform 4 can be aligned with and coupled to the guideways 5 of the loading area 2 of the transport vehicle 1.

According to FIG. 2, the transport vehicle 1 is brought in reverse towards the edge 8 of the permanent material-handling platform 4 in such a way that the guideways 5 and the guideways 6 align and interengage perfectly. Hence, the loading area 2 of the transport vehicle forms actually an extension of the material-handling platform 4.

In order to make full use of the available loading space, the loading area 2 of the transport vehicle 1 is provided in the embodiment with two parallel guideways 5 running along the length of the transport vehicle 1. In special cases and when containers of relatively small dimensions are handled, more than two parallel guideways 5 can be arranged on the loading area 2 of the transport vehicle 1.

In order to be able to compensate for variations in the height of the loading area 2 above the track, caused by different loadings of the loading area 2 of the transport vehicle 1 with respect to the constant height of the permanent material-handling platform 4, it is expedient to provide a connecting platform 10 which can be inserted between the material-handling platform 4 and the loading area 2. This platform is equipped with connecting guides 11 which are similar to the guideways 5, 6 and act as extensions of the same. In the embodiment shown in FIG. 3, the connecting platform 10 is linked with the permanent material-handling platform 4 by means of a hinge 23. It is also possible to take along such a platform with the transport vehicle 1 and to link it up with the latter, when it is needed.

While the guideways 6 of the permanent material-handling platform 4 are represented equipped with rolls 50 (FIGS. 2, 3), the embodiment has no mobile parts provided for the guideways 5 of the loading area 2 of the transport vehicle 1. The susceptibility to breakdowns and necessary repairs is reduced by such a design. Thus, the embodiment shows the equipment of the loading area 2 of the transport vehicle 1 with slideways guides (FIGS. 1 to 3, 6).

In the embodiments shown in FIGS. 4 to 6, each of the containers 9 is provided with feet 14. By means of these feet 14 it can be supported on a base 16, e.g., a floor. When it is conveyed along the guideways 5, 6 of the material-handling platform 4 and of the loading area 2, respectively, the feet 14 are lifted off the floor of the material-handling platform 4 or the loading area 2. In the loading area 2 of the transport vehicle 1 this is obtained by the fact that the feet are equipped with laterally projecting skids 15 the bottom surfaces of which rest on slide rails 13 of the guideways 5. These slide rails 13 can be, by way of example, the lower flanges of U-sections so that the upper flanges 22 of the latter form at the same time safeguards against a possible overturning of the containers. For the permanent material-handling platform 4, FIG. 7 shows an advantageous structural construction. The rolls 12 of two neighboring guideways have in FIG. 7 a common bearing 18 by means of which they are rotatably arranged at such a distance from the floor of the material-handling platform 4 that the rolls 12 supporting the bottom 17 of the container effect a raising of the feet 14 of the container from the floor of the material-handling platform 4 when the containers are suported on the rolls 12. At the same time the skids 15 are in a position in which they are free and do not contact the lower flange of guideway 6 as is clearly evident from FIG. 7.

Since it may frequently be desirable to convey container 9 to a final receiver point, it is expedient to provide a hoisting stacker 21, on the transport vehicle 1. For this purpose, the embodiment represented in FIG. 8 has a platform 19 forming the loading area 2 which is provided with recesses 20 at its rear wall 3'; these recesses extend longitudinally of the transport vehicle 1 and support the fork arms 40 of the hoisting stacker 21 when it is at rest during the transport. The hoisting stacker 21 is comprised in known manner of a base 41 mounted on rollers 42. Secured to the base 42 is a mast 43 on which a carrier 44 is displaceable. The arms 40 are secured to the carrier 44 for movement therewith.

If the containers are without rollers, the sliding displacement described in FIGS. 1 to 3 and 6 may require a relatively great effort, if the goods are heavy. This can be considerably reduced by the alternative embodiment represented in FIGS. 9 to 11, ensuring at the same time a particularly careful handling of the container. This is for instance important for exchange pallets which must be handled with special care.

Figure 11:
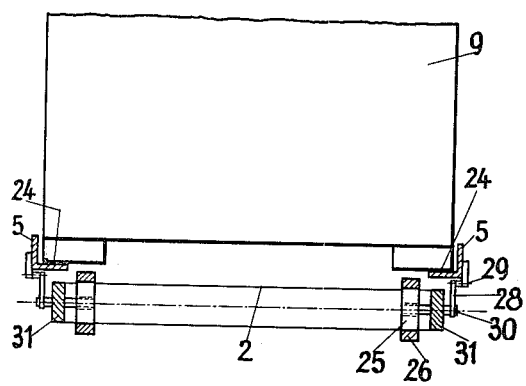

According to FIGS. 9 to 11, the guideways 5, 6 and suitable parts of them, respectively, are equipped with seats 24 for the containers 9. Preferably, the guideways are constituted by angle sections having horizontal finages supporting the containers 9 from below and constituting the seats 24. These seats 24 are designed in such a way that they can be lifted or lowered with respect to the rolls 25 which are supported suitably on the loading area 2 and/or on the material-handling platform 4. In the embodiment, the rolls 25 are supported in fixed location for rotation on the loading area 2 and on the material-handling platform 4; they form parts of a conveyor device. The drawings shows the conveyor belt 26 and the driving cylinders 27 for a conveyor belt device. Rocking levers 28 are provided to lift and lower the seats 24 of the angle sections. These levers are suitably connected by pivots 29 and 30 on the one hand with the angle sections and the seats 24 and on the other hand with the loading area 2 and the material-handling platform 4 and with elements fixed onto them, respectively. The fixed supporting points of the rolls 25 which can also be provided with stops for the lowered position of the seats 24 of the angle sections, are designated by numeral 31. In order to raise the seats 24, it is only necessary to longitudinally displace the guideways 5. This causes the links 28 to undergo pivotal movement into a more nearly vertical position, thereby raising the seats 24. To lower the seats, the guideways 5 are merely displaced in the opposite direction. In the embodiment shown, the guideways 6 of the material-handling platform 4 are represented in the lowered position, while the guideways 5 of the loading area 2 are shown in their raised position. This has been done only to make the drawing simple. In operation, all guideways are lowered during the displacement so that the seats are approximately in the same horizontal plane below the supporting surfaces of the transport tracks. In FIG. 9 it is assumed that the guideways 6 of the material-handling platform 4 are lowered for the phase of displacement (FIG. 10), while the displacement procedure is assumed already completed for the loading area 2 of the transport vehicle 1, so that the guideways 5 of the loading area 2 are lifted. There, the containers rest on the seats 24 of the guideways 5 and are thus sufficiently protected from a chance dislocation owing to contact friction.

The design of guideway elements which can be lifted or lowered may relate to the loading area as well as to the material-handling platform, or to both.

The invention has been discussed above based on a few embodiments only and can be realized, moreover, in numerous further embodiments.

What I claim is:

1. In combination with load carriers of a common size and shape, apparatus for loading and unloading the load carriers individually, said apparatus comprising a fixed storage platform having a free edge, a vehicle adapted for being placed adjacent said free edge of the platform to load and unload the load carriers between said vehicle and said platform, said vehicle including a body, wheels supporting said body, said body having a flat upper loading platform, said body including a driver's cabin beneath the loading platform, said platform extending the entire length of the vehicle, longitudinal slide rails on and extending the entire length of the loading platform, said slide rails having a lateral spacing to support load carriers individually for movement between the front and back of the vehicle while restricting lateral movement of the load carriers, slide rails on said storage platform having the same spacing as the slide rails on the platform of the vehicle whereby the vehicle can be driven forwardly and rearwardly towards the fixed platform to align the slide rails on the vehicle with the slide rails on the storage platform for the loading and unloading of the load carriers individually between the vehicle and the fixed platform, said load carriers including feet at the margins thereof, and laterally projecting skids on each foot extending outwardly and engageable in sliding relation in the slide rails on the vehicle, the latter slide rails having a channel cross-section with upper and lower flanges, the skids on the load carriers projecting between the flanges of the slide rails on the vehicle and being supported on the lower flanges thereof, the slide rails being supported on the vehicle with the lower flanges thereof located at a height which exceeds the distance of the skids from the bottom of the load carriers whereby the feet of the load carriers will be lifted above the surface of the vehicle when the load carriers are slidably advanced in the slide rails, the upper flanges of the slide rails preventing tilting of the skids in the slide rails, said slide rails on the storage platform comprising a lower flange, a bearing member and a roller rotatably supported in the bearing member, said roller being at a height to engage and support the load carriers at the lower surface thereof such that the feet and skids are freely suspended at a level whereby the load carriers may be transferred to and from the slide rails on the vehicle in a manner such that the skids will rest on the lower flanges of the slide rails when on the vehicle.

2. The combination as claimed in claim 1 comprising a connecting platform between the vehicle and the storage platform and including extension guide rails for connecting the guide rails of the loading platform of the vehicle with those of the storage platform.

3. The combination as claimed in claim 1 wherein at least two of said guide rails on the storage platform are adjacent one another and comprise co-axial rolls, which are supported from a common bearing member.

4. The combination as claimed in 1 wherein said guide rails on the vehicle and the storage platform define a plurality of adjacent longitudinal guideways for the objects, at least two guide rails on the vehicle and storage platform being adjacent one another.

References Cited by the Examiner
UNITED STATES PATENTS

| | | | |
|---|---|---|---|
| 778,613 | 12/1904 | Ward | 214—84 |
| 1,270,086 | 6/1918 | Wochner | 214—38.8 X |
| 1,451,127 | 4/1923 | Thornton | 214—38.8 |
| 1,611,882 | 12/1926 | Budd | 214—38.8 |
| 1,627,135 | 5/1927 | Ario | 214—38.40 |
| 2,021,503 | 11/1935 | Fildes | 214—38.40 X |
| 2,127,058 | 8/1938 | Fitch | 214—516 |
| 2,442,549 | 6/1948 | Pearlman | 214—38.8 X |
| 2,490,162 | 12/1949 | Ruelle | 180—89 |
| 2,710,105 | 6/1955 | Schwartz | 213—38.46 X |
| 2,711,835 | 6/1955 | Kappen | 214—38.20 |
| 2,856,085 | 10/1958 | Ryan | 214—38.8 |
| 2,904,802 | 9/1959 | Hartman | 214—38.22 |
| 3,064,836 | 11/1962 | Rupert | 214—516 X |

FOREIGN PATENTS

| | | |
|---|---|---|
| 826,549 | 1/1952 | Germany. |
| 529,605 | 11/1940 | Great Britain. |

GERALD M. FORLENZA, *Primary Examiner.*

HUGO O. SCHULZ, *Examiner.*